(12) United States Patent
Porras et al.

(10) Patent No.: US 9,745,933 B2
(45) Date of Patent: Aug. 29, 2017

(54) FUEL PRESSURE REGULATOR

(71) Applicant: DELPHI TECHNOLOGIES, INC., Troy, MI (US)

(72) Inventors: Luis M. Porras, Cd. Juarez (MX); Isai Chavez, Cd. Juarez (MX); Jamie A. Puente, Cd. Juarez (MX); Salvador Sanchez, Juarez (MX); Michael J. McHale, El Paso, TX (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 67 days.

(21) Appl. No.: 14/607,385

(22) Filed: Jan. 28, 2015

(65) Prior Publication Data
US 2016/0215741 A1  Jul. 28, 2016

(51) Int. Cl.
| F16K 15/00 | (2006.01) |
| F02M 55/04 | (2006.01) |
| G05D 16/10 | (2006.01) |
| F02M 69/54 | (2006.01) |
| F02M 63/00 | (2006.01) |
| F02M 63/02 | (2006.01) |
| F16K 17/04 | (2006.01) |

(52) U.S. Cl.
CPC .......... *F02M 55/04* (2013.01); *F02M 63/005* (2013.01); *F02M 63/0036* (2013.01); *F02M 63/0052* (2013.01); *F02M 63/0075* (2013.01); *F02M 63/0235* (2013.01); *F02M 69/54* (2013.01); *F16K 17/0433* (2013.01); *G05D 16/103* (2013.01); *Y10T 137/7927* (2015.04); *Y10T 137/7928* (2015.04)

(58) Field of Classification Search
CPC ......... Y10T 137/7898; Y10T 137/7901; Y10T 137/7927; Y10T 137/7928; Y10T 137/7922; Y10T 137/7929
See application file for complete search history.

(56) References Cited

U.S. PATENT DOCUMENTS 2,284,457 A * 5/1942 Van Nest ............ F16K 17/0446
137/527
2,714,392 A * 8/1955 Mercier .................... F16K 1/14
137/514.7

(Continued)

FOREIGN PATENT DOCUMENTS

CN 100414105 C 8/2008
DE 3143916 A1 5/1983

(Continued)

*Primary Examiner* — R. K. Arundale
(74) *Attorney, Agent, or Firm* — Joshua M. Haines

(57) ABSTRACT

A fuel pressure regulator includes a housing defining a fuel inlet and a fuel outlet; a valve seat located between the fuel inlet and the fuel outlet, the valve seat being centered about a valve seat axis; a valve member centered about a valve member axis, the valve member being moveable between 1) a closed position where the valve member engages the valve seat to prevent fuel flow from the fuel inlet to the fuel outlet and 2) an open position where the valve member is disengaged from the valve seat to permit fuel flow from the fuel inlet to the fuel outlet; and a grounding member grounded to the housing which engages the valve member to cause the valve member axis to tip relative to the valve seat axis when the valve member moves from the closed position to the open position.

5 Claims, 4 Drawing Sheets

(56) References Cited

U.S. PATENT DOCUMENTS

| | | | | |
|---|---|---|---|---|
| 3,465,787 | A | * | 9/1969 | Gulick ................ F16K 1/14 137/527 |
| 4,083,184 | A | * | 4/1978 | Ushijima ............. F01N 3/30 137/515.7 |
| 4,354,640 | A | * | 10/1982 | Hans ................. F02M 51/065 239/533.9 |
| 6,401,749 | B1 | | 6/2002 | Tai et al. |
| 6,802,340 | B1 | | 10/2004 | Gutmann et al. |
| 6,895,996 | B2 | | 5/2005 | Gutmann et al. |
| 8,302,622 | B2 | | 11/2012 | Pena De Santiago |
| 8,979,517 | B2 | * | 3/2015 | Omura ............... F04C 29/128 418/11 |
| 2003/0196702 | A1 | * | 10/2003 | Bueser .............. F02M 69/54 137/535 |
| 2003/0230930 | A1 | | 12/2003 | Inage et al. |
| 2004/0149338 | A1 | * | 8/2004 | Wheeler ............. F02M 69/54 137/539 |
| 2004/0223856 | A1 | | 11/2004 | Rembold et al. |
| 2005/0005973 | A1 | * | 1/2005 | Haarer .............. F02M 69/54 137/538 |
| 2005/0081830 | A1 | | 4/2005 | Yu et al. |
| 2009/0056817 | A1 | | 3/2009 | Almaraz et al. |
| 2011/0186152 | A1 | | 8/2011 | Herrera |
| 2014/0311597 | A1 | | 10/2014 | Mooney et al. |

FOREIGN PATENT DOCUMENTS

| | | |
|---|---|---|
| DE | 10059954 A1 | 6/2002 |
| GB | 2060142 A | 4/1981 |
| KR | 101178467 B1 | 9/2012 |
| WO | 2007/040169 A1 | 4/2007 |

\* cited by examiner

FUEL PRESSURE REGULATOR

TECHNICAL FIELD OF INVENTION

The present invention relates to a fuel pressure regulator, more particularly to a fuel pressure regulator which is a flow through pressure regulator, and even more particularly to a fuel pressure regulator which minimizes noise and vibration generated by a valve member of the fuel pressure regulator.

BACKGROUND OF INVENTION

Fuel systems for supplying liquid fuel, by way of non-limiting example only, gasoline or diesel fuel, to an internal combustion engine typically include a fuel tank for storing a volume of fuel, a fuel pump for pumping fuel from the fuel tank to a fuel rail mounted to the internal combustion engine. The fuel rail includes a plurality of fuel injectors such that each fuel injector is arranged to inject fuel to a respective combustion chamber of the internal combustion engine. The fuel rail provides a common volume of fuel from which each of the plurality of fuel injectors receives fuel. The fuel pump is typically designed to provide fuel at a constant flow and pressure that meets or exceeds the requirements of the internal combustion engine at maximum output of the internal combustion engine. However, the internal combustion engine is primary operated below its maximum out capability, and consequently, typically does not require all of the fuel supplied by the fuel pump. Consequently, the fuel system typically includes a fuel pressure regulator which maintains a constant pressure within the fuel rail by recirculating a portion of the fuel pump output back to the fuel tank. The fuel pressure regulator may be located within the fuel tank or remote from the fuel tank.

One type of fuel pressure regulator is shown in United States Patent Application Publication No. US 2011/0186152 A1 to Herrera, hereinafter referred to as Herrera. The fuel pressure regulator of Herrera is commonly referred to as a flow-through fuel pressure regulator because fuel must flow around a valve member in order to pass from a fuel inlet to a fuel outlet. The valve member is biased toward a valve seat by a valve spring such that the force applied by the valve spring holds the valve member against the valve seat when the fuel pressure within the fuel rail is at or below a predetermined fuel pressure, thereby preventing fuel from flowing from the fuel inlet to the fuel outlet. Conversely, when the fuel pressure within the fuel rail is above the predetermined fuel pressure, the fuel pressure overcomes the force of the valve spring, thereby causing the valve member to disengage from the valve seat and allow fuel to flow from the fuel inlet to the fuel outlet. The valve member will remain disengaged from the valve seat until the fuel pressure within the fuel rail is returned to the predetermined fuel pressure, and then the valve spring will again move the valve member into engagement with the valve seat.

While the fuel pressure regulator of Herrera may be effective for regulating the fuel pressure, it is common for fuel pressure regulators such as those disclosed by Herrera to generate vibration and noise. The noise and vibration are the result of axial and lateral movement of the valve member at high frequencies due to the fuel flowing around the valve member. The noise and vibration may be of a magnitude that may be objectionable to a person that is in or about a motor vehicle that includes such a fuel pressure regulator.

U.S. Pat. No. 8,302,622 to De Santiago, hereinafter referred to as De Santiago, teaches a fuel pressure regulator which includes a pressure differential creation structure to create a differential pressure around the valve member which causes unbalanced flow to promote the valve member to move toward a certain location in the open position in an effort to minimize noise and vibration. While the arrangement of De Santiago may reduce noise and vibration compared to the arrangement of Herrera, improvements are continually desired.

What is needed is a fuel pressure regulator which minimizes or eliminates one or more the shortcomings as set forth above.

SUMMARY OF THE INVENTION

Briefly described, a fuel pressure regulator includes a housing defining a fuel inlet and a fuel outlet; a valve seat located between the fuel inlet and the fuel outlet, the valve seat being centered about a valve seat axis; a valve member centered about a valve member axis, the valve member being moveable between 1) a closed position where the valve member engages the valve seat to prevent fuel flow from the fuel inlet to the fuel outlet and 2) an open position where the valve member is disengaged from the valve seat to permit flow fuel from the fuel inlet to the fuel outlet; and a grounding member grounded to the housing which engages the valve member to cause the valve member axis to tip relative to the valve seat axis when the valve member moves from the closed position to the open position. The grounding member minimizes or eliminates vibration and noise of the valve member due to fuel flowing from the fuel inlet to the fuel outlet.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
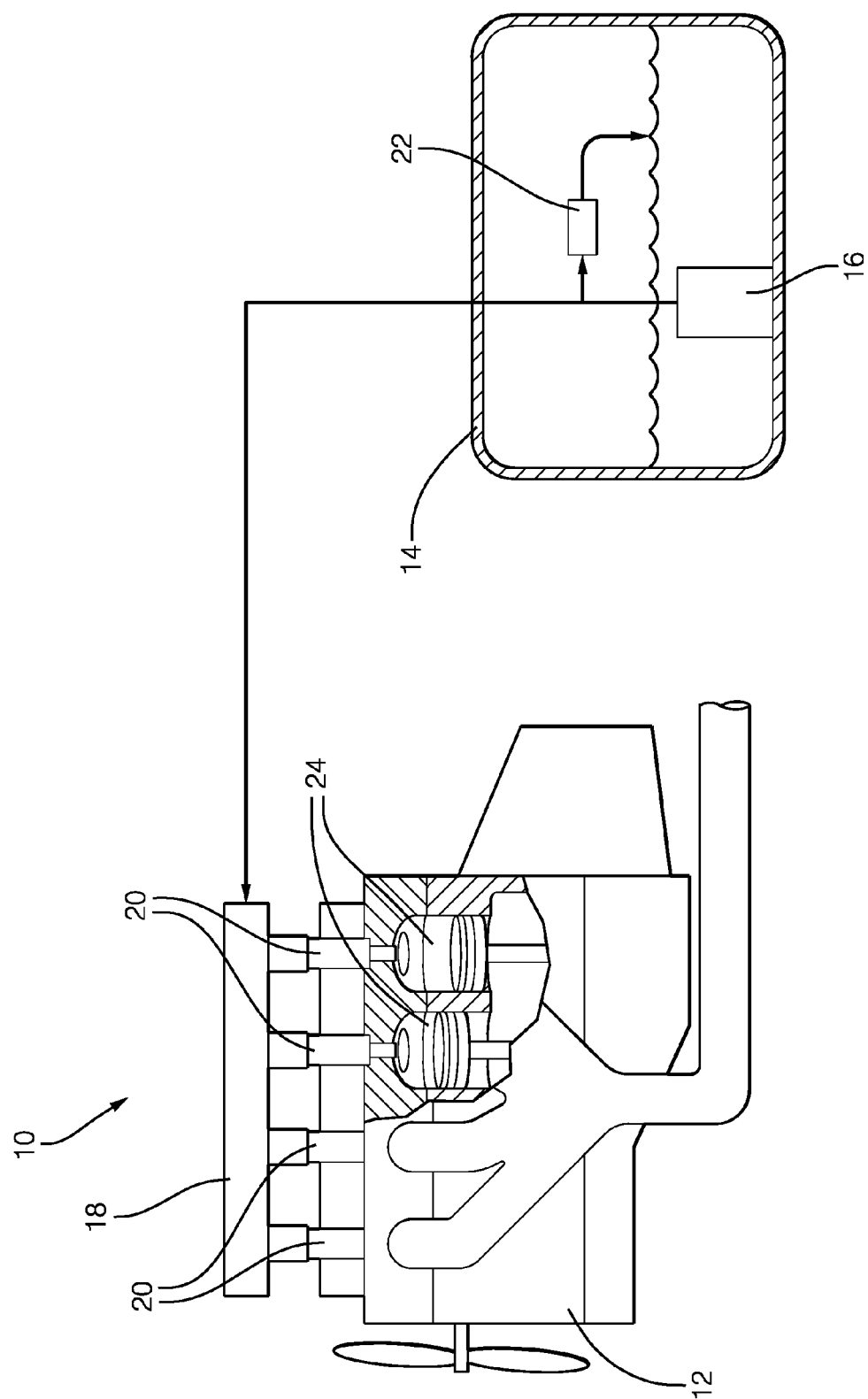
FIG. 1 is a schematic view of a fuel system which includes a fuel pressure regulator in accordance with the present invention.
Figure 2:
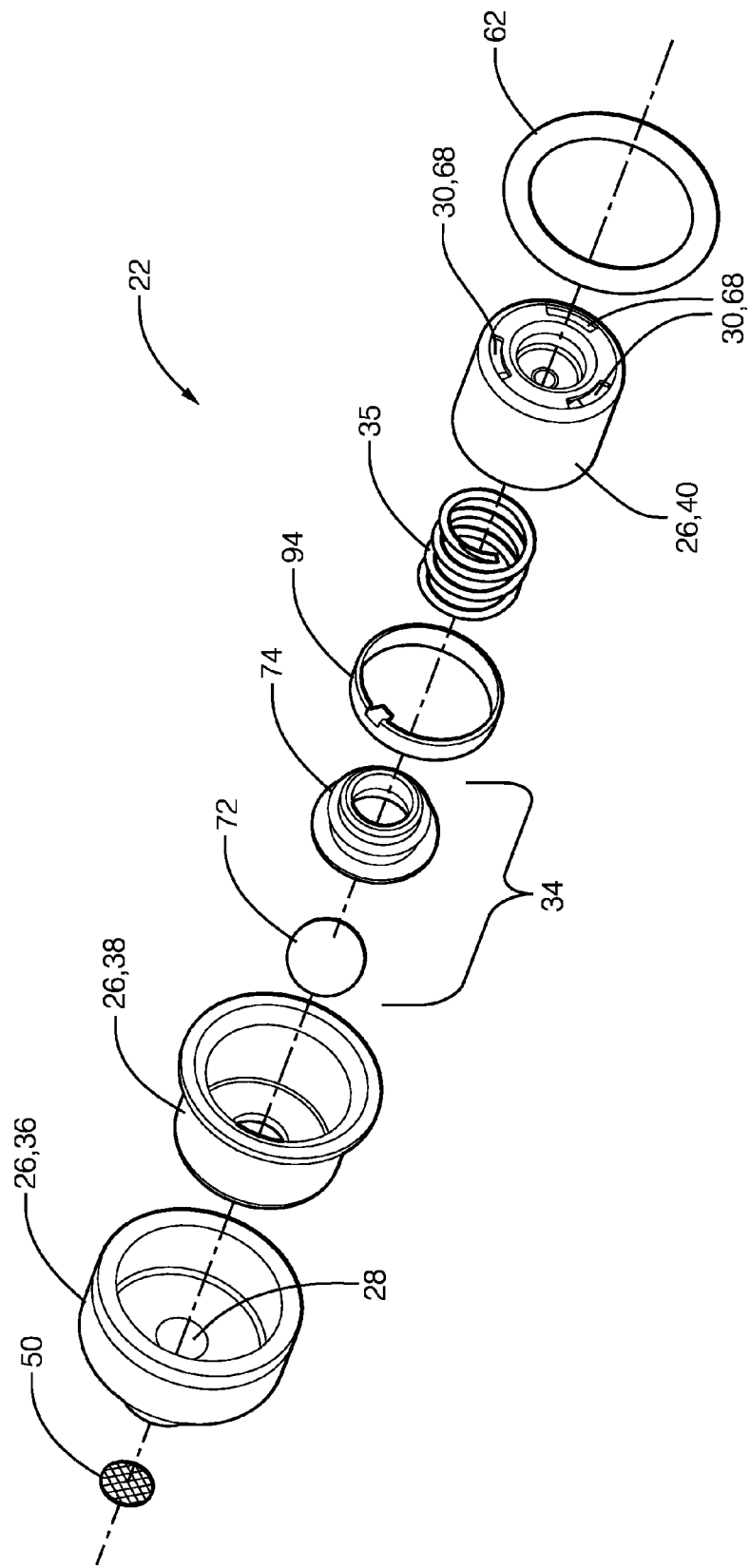
FIG. 2 is an exploded isometric view of the fuel pressure regulator in accordance with the present invention.

Referring to FIG. 1, a fuel system 10 is shown in simplified schematic form for supplying fuel to an internal combustion engine 12, by way of non-limiting example only, for a motor vehicle. Fuel system 10 includes a fuel tank 14 for storing a volume of fuel, a fuel pump 16 which may be located within fuel tank 14 as shown, a fuel rail 18 attached to internal combustion engine 12 and in fluid communication with fuel pump 16, a plurality of fuel injectors 20 in fluid communication with fuel rail 18, and a fuel pressure regulator 22 which regulates the fuel pressure within fuel rail 18. In operation, fuel pump 16 draws fuel from fuel tank 14 and pumps the fuel to fuel rail 18 under pressure. Each fuel injector 20 receives fuel from fuel rail 18 and injects the fuel to a respective combustion chamber 24 of internal combustion engine 12 for combustion of the fuel within combustion chambers 24. Fuel pressure regulator 22 maintains a substantially uniform pressure within fuel rail 18 by recirculating fuel to fuel tank 14 when the pressure within fuel rail 18 is elevated above a predetermined fuel pressure. While fuel pump 16 and fuel pressure regulator 22 have both been illustrated as being located within fuel tank 14, one or both of fuel pump 16 and fuel pressure regulator 22 may alternatively be located outside of fuel tank 14.

In accordance with a preferred embodiment of this invention and now referring to FIGS. 1-4, fuel pressure regulator 22 will now be described in greater detail. Fuel pressure regulator 22 generally includes a housing 26 defining a fuel inlet 28 and a fuel outlet 30; a valve seat 32 located between fuel inlet 28 and fuel outlet 30; a valve member 34 moveable between a closed position (shown in FIG. 3) and an open position (shown in FIG. 4) with valve seat 32; and a valve spring 35 which biases valve member 34 toward valve seat 32 where valve spring 25 is a coil compression spring as shown. Fuel inlet 28 is in fluid communication with the outlet of fuel pump 16 while fuel outlet 30 is in fluid communication with the interior of fuel tank 14. The various elements of fuel pressure regulator 22 will be described in the paragraphs that follow.

As illustrated herein, housing 26 comprises a holder 36 which is used to mount fuel pressure regulator 22, an inner housing 38, and an outer housing 40. Holder 36 includes an annular holder sidewall 42 which is centered about a valve seat axis 44. An annular holder end wall 46 extends radially inward from one end of holder sidewall 42 such that fuel inlet 28 is defined coaxially through holder end wall 46. A holder connector 48 extends coaxially from holder end wall 46 in a direction opposite from holder sidewall 42 such that fuel inlet 28 is further defined coaxially through holder connector 48. A filter 50 may be disposed within fuel inlet 28 to prevent any foreign material that may be present in fuel supplied by fuel pump 16 from being communicated further into fuel pressure regulator 22. Holder 36 may preferably be made of a plastic material, however, may alternatively be made of a metallic material.

Inner housing 38 includes an annular inner housing sidewall 52 which is partly received coaxially within holder sidewall 42. An annular inner housing end wall 54 extends radially inward from the end of inner housing sidewall 52 that is received within holder sidewall 42 such that an inner housing aperture 56 extends coaxially through inner housing end wall 54, thereby defining valve seat 32 such that valve seat 32 is centered about valve seat axis 44. Inner housing 38 is retained within holder 36, by way of non-limiting example only, by press fit between holder sidewall 42 and inner housing sidewall 52 such that inner housing end wall 54 abuts holder end wall 46. An inner housing flange 58 extends radially outward from the end of inner housing sidewall 52 that is opposite from inner housing end wall 54, thereby defining an O-ring groove 60 with holder 36 in order to receive an O-ring 62. O-ring 62 is used to provide a fluid tight seal between fuel pressure regulator 22 and a bore (not shown) within which fuel pressure regulator 22 is mounted where the bore may be, by way of non-limiting example only, a bore of a fuel module which also houses fuel pump 16 within fuel tank 14. In this way, O-ring 62 prevents fuel from bypassing fuel pressure regulator 22. Inner housing 38 may be made of a metallic material, by way of non-limiting example only, stainless steel, or may alternatively be made of a plastic material.

Outer housing 40 includes an annular outer housing sidewall 64 which is partly received coaxially within inner housing sidewall 52. An outer housing end wall 66 extends radially inward from the end of outer housing sidewall 64 that is not received within inner housing sidewall 52. A plurality of outer housing end wall apertures 68 extend through outer housing end wall 66 such that outer housing end wall apertures 68 define fuel outlet 30. Outer housing end wall 66 defines a spring locator 70 which extends coaxially from outer housing end wall 66 toward inner housing end wall 54 such that outer housing sidewall 64 coaxially surrounds spring locator 70. One end of valve spring 35 radially surrounds spring locator 70 and is in compression against outer housing end wall 66 such that spring locator 70 substantially prevents radial movement of the end of valve spring 35 that radially surrounds spring locator 70. Outer housing 40 may be made of a metallic material, by way of non-limiting example only, stainless steel, or may alternatively be made of a plastic material.

Valve member 34 may be of two-piece construction as shown such that valve member 34 includes a ball 72 which selectively seats with valve seat 32 and a ball holder 74 which is fixed to ball 72 and engages valve spring 35. Valve member 34 is located between fuel inlet 28 and fuel outlet 30 such that valve member 34 is centered about a valve member axis 76 which is inclined to valve seat axis 44 as will be described in greater detail later.

Ball 72 is spherical, thereby not requiring specific orientation with ball holder 74 or valve seat 32. Ball 72 may be made of a metallic material, by way of non-limiting example only, stainless steel, or may alternatively be a plastic or elastomeric material.

Ball holder 74 includes ball holder body 78 extending in the direction of valve member axis 76 from a ball holder body first end 80 to a ball holder body second end 82 such that ball holder body first end 80 is proximal to inner housing end wall 54 of inner housing 38. A ball holder bore 84 extends coaxially through ball holder body 78 such that ball holder bore 84 is centered about valve member axis 76. As shown, ball holder bore 84 may be stepped, thereby defining a ball holder bore first section 86 that extends into ball holder body 78 from ball holder body first end 80 and also defining a ball holder bore second section 88 that extends into ball holder body 78 from ball holder body second end 82 such that ball holder bore first section 86 is larger in diameter than ball holder bore second section 88. Ball 72 is retained within ball holder bore first section 86, for example by a press fit interface between ball 72 and ball holder bore first section 86. The transition between ball holder bore first section 86 and ball holder bore second section 88 provides a positive stop for ball 72 to abut when inserted into ball holder bore 84. A ball holder grounding flange 90 extends radially outward from ball holder body first end 80 such that ball holder grounding flange 90 is annular in shape and such that ball holder grounding flange 90 is substantially perpendicular to valve member axis 76. The function of ball holder grounding flange 90 will be described in detail later. A ball holder spring seat 92 extends radially outward from ball holder body 78 at a location along valve member axis 76 that is between ball holder body first end 80 and ball holder body second end 82 such that ball holder spring seat 92 is substantially perpendicular to valve member axis 76. Ball holder spring seat 92 is sufficiently large in diameter so as to allow an end of valve spring 35 to axially engage ball holder spring seat 92 such that valve spring 35 radially surrounds the portion of ball holder body 78 from ball holder body first end 80 to ball holder spring seat 92. Valve spring 35 is compressed between outer housing end wall 66 and ball holder spring seat 92, thereby biasing valve member 34 toward valve seat 32. The force exerted by valve spring 35 may be adjusted in the assembly process of fuel pressure regulator 22 by fixing outer housing 40 at an axial position relative to inner housing 38 that achieves a desired force produced by valve spring 35. In this way, valve spring 35 will allow valve member 34 to unseat from valve seat 32 when the fuel pressure within fuel rail 18 is above the predetermined pressure.

A grounding member 94, which is grounded to housing 26 and stationary relative to housing 26, is provided in order to ground valve member 34 to housing 26 and to provide imbalance to valve member 34, thereby reducing vibration and noise during operation of fuel pressure regulator 22. Grounding member 94 includes a grounding member base 96 which may be annular in shape as shown and centered about valve seat axis 44. Grounding member 94 also includes a grounding member arm 98 which extends radially inward from grounding member base 96 sufficiently far so as to radially overlap ball holder grounding flange 90 while not extending sufficient far so as to reach ball holder body 78. Grounding member arm 98 is axially offset from inner housing end wall 54 a predetermined distance 100 that causes grounding member arm 98 to engage ball holder grounding flange 90 and urge ball holder grounding flange 90 toward inner housing end wall 54 at one radial location of ball holder grounding flange 90, thereby causing valve member axis 76 to be inclined relative to valve seat axis 44 when ball 72 is seated on valve seat 32. Furthermore, since ball holder grounding flange 90 is captured between grounding member arm 98 and inner housing end wall 54, valve member axis 76 is caused to tip relative to valve seat axis 44 and to be inclined to a greater extent when ball 72 is unseated from valve seat 32. In this way, grounding member arm 98 prevents movement of valve member 34 in the direction of valve seat axis 44 at the point where valve member 34 pivots about grounding member arm 98. In an alternative arrangement, grounding member base 96 may be omitted, and grounding member arm 98 may be secured directly to housing 26. For example, if grounding member base 96 is omitted, grounding member arm 98 may take the form of a pin which is inserted into a hole formed radially through inner housing sidewall 52 and fixed thereto, by way of non-limiting example only, by a press fit connection such that the pin extends radially inward from inner housing sidewall 52 to capture ball holder grounding flange 90 between the pin and inner housing end wall 54. In another alternative arrangement, the grounding member may take the form of a protrusion that is located under ball holder grounding flange 90, i.e. between ball holder grounding flange 90 and inner housing end wall 54. In this alternative embodiment, the grounding member may be fixed to either inner housing 38 or ball holder grounding flange 90. Whether the grounding member is fixed to inner housing 38 or ball holder grounding flange 90, the grounding member is grounded to housing 26 and the grounding member causes valve member axis 76 to be inclined relative to valve seat axis 44 when ball 72 is seated on valve seat 32. However, valve member axis 76 is caused to be inclined to a lesser extent as ball 72 is unseated from valve seat 32 when the grounding member is located under ball holder grounding flange 90.

Figure 3:
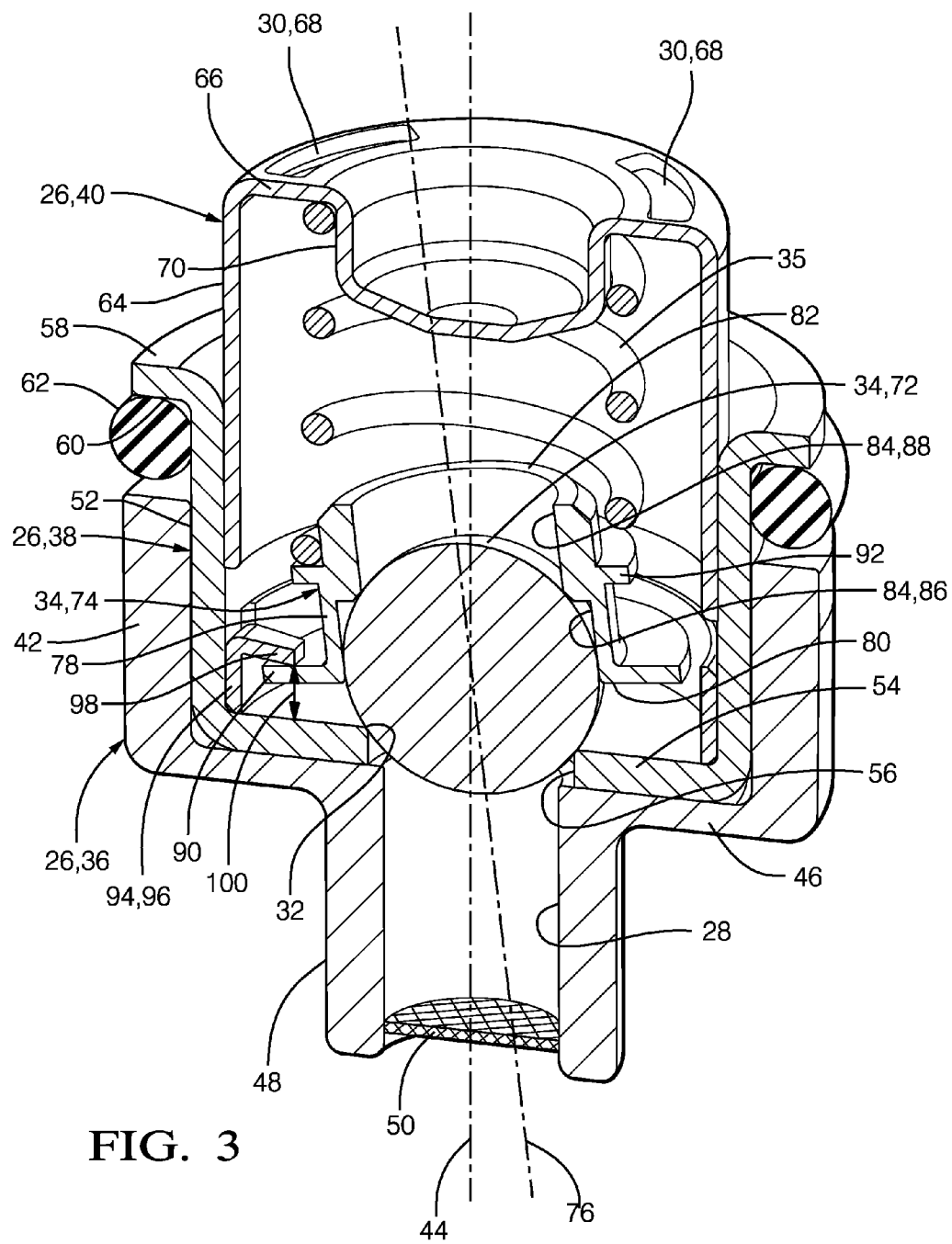
FIG. 3 is an isometric axial cross-sectional view of the fuel pressure regulator in accordance with the present invention shown in a closed position.

The operation of fuel pressure regulator 22 will now be described with continued reference to FIGS. 1-4. When the fuel pressure within fuel rail 18 is at or below the predetermined fuel pressure, the fuel pressure acting on valve member 34 is insufficient to overcome the force of valve spring 35. Consequently, as shown in FIG. 3, valve member 34 is in the closed position where valve member 34 engages valve seat 32, thereby preventing fuel from flowing from fuel inlet 28 to fuel outlet 30 due to valve spring 35 holding valve member 34 in engagement with valve seat 32. In the closed position, grounding member 94 is engaged with ball holder grounding flange 90 such that grounding member arm 98 causes valve member axis 76 to be inclined relative to valve seat axis 44 due to predetermined distance 100 between inner housing end wall 54 and grounding member arm 98. By having valve member axis 76 inclined relative to valve seat axis 44 in the closed position, valve spring 35 applies an unbalanced force to valve member 34 in the closed position and in the open position. More specifically, having valve member axis 76 inclined relative to valve seat axis 44 in the closed position causes ball holder spring seat 92 to be inclined relative to outer housing end wall 66 upon which one end of valve spring 35 is seated, thereby causing valve spring 35 to apply a lesser force to the radial location of valve member 34 that engages grounding member arm 98 compared to the force applied by valve spring 35 to the radial location of valve member 34 that diametrically opposes grounding member arm 98.

Figure 4:
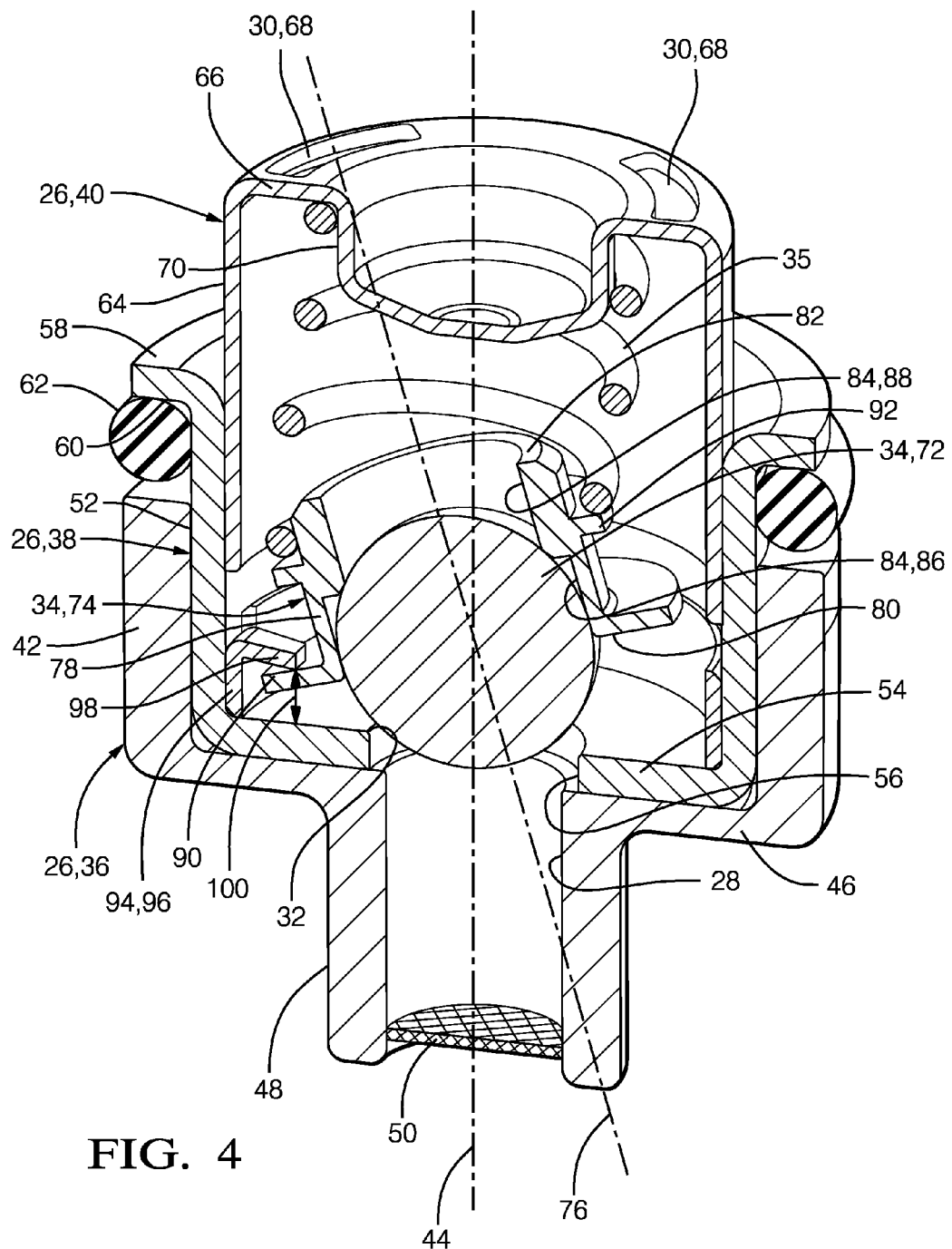
FIG. 4 is the isometric axial cross-section view of FIG. 4 now shown in an open position.

When the fuel pressure within fuel rail 18 is above the predetermined fuel pressure, the fuel pressure acting on valve member 34 is sufficient to overcome the force of valve spring 35. Consequently, as shown in FIG. 4, valve member 34 is moved to the open position where valve member 34 is disengaged from valve seat 32, thereby permitting fuel to flow from fuel inlet 28 to fuel outlet 30 such that the fuel flows around valve member 34. As valve member 34 moves from the closed position to the open position, valve member 34 pivots about grounding member arm 98, thereby causing valve member axis 76 to tip relative to valve seat axis 44. As valve member axis 76 tips relative to valve seat axis 44 when valve member 34 moves from the closed position to the open position, valve member axis 76 becomes inclined to valve seat axis 44 to a greater extent than in the closed position. Since valve member 34 is grounded to housing 26 through grounding member 94, vibration of valve member 34 by fuel flowing from fuel inlet 28 to fuel outlet 30 is minimized, thereby minimizing noise associated with vibration of valve member 34. Furthermore, the force imbalance of valve spring 35 on valve member 34 is significantly higher than the hydraulic forces from the flow of fuel from fuel inlet 28 to fuel outlet 30 that would tend to cause valve member 34 to generate vibration and noise, consequently minimizing the vibration and noise generated by valve member 34.

While valve member 34 has been illustrated and described herein as including ball 72 which is spherical, it should now be understood that valve members of other shapes may be alternatively used, by way of non-limiting example only, conical valve members or flat valve members.

While this invention has been described in terms of preferred embodiments thereof, it is not intended to be so limited, but rather only to the extent set forth in the claims that follow.

We claim:

1. A fuel pressure regulator comprising:
a housing defining a fuel inlet and a fuel outlet;
a valve seat located between said fuel inlet and said fuel outlet, said valve seat being centered about a valve seat axis;
a valve member centered about a valve member axis, said valve member being moveable between 1) a closed position where said valve member engages said valve seat to prevent fuel flow from said fuel inlet to said fuel outlet and 2) an open position where said valve member is disengaged from said valve seat to permit fuel flow from said fuel inlet to said fuel outlet;
a valve spring which biases said valve member toward said valve seat; and
a grounding member grounded to said housing which directly contacts said valve member to cause said valve member axis to tip relative to said valve seat axis when said valve member moves from said closed position to said open position;
wherein said housing comprises:
an inner housing defined by an annular inner housing sidewall and by an inner housing end wall extending radially inward from one end of said inner housing sidewall such that said inner housing end wall defines said valve seat and such that said inner housing sidewall is coaxial with said valve seat; and
an outer housing defined by an annular outer housing sidewall and by an outer housing end wall extending radially inward from one end of said outer housing sidewall such that said outer housing defines said fuel outlet and said outer housing sidewall is coaxial with said inner housing sidewall;
wherein said valve member is located between said inner housing end wall and said outer housing end walls;
wherein said valve member includes a grounding flange extending in a direction radially outward from said valve member axis; and
wherein a portion of said grounding flange is captured between said grounding member and said inner housing end wall.

2. A fuel pressure regulator as in claim 1, wherein said grounding member causes said valve spring to apply an unbalanced force on said valve member.

3. A fuel pressure regulator as in claim 2 wherein said grounding member causes said valve spring to apply said unbalanced force on said valve member in said closed position and said open position.

4. A fuel pressure regulator as in claim 1 wherein said grounding member comprises:
an annular grounding member base fixed within said inner housing sidewall; and
a grounding member arm which extends radially inward from said grounding member base such that said grounding flange is captured between said grounding member arm and said inner housing end wall.

5. A fuel pressure regulator as in claim 1 wherein said grounding member is fixed within said inner housing sidewall.

* * * * *